(12) United States Patent
Blessent

(10) Patent No.: US 6,947,472 B2
(45) Date of Patent: Sep. 20, 2005

(54) NOISE GAIN CONTROL

(75) Inventor: Luca Blessent, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 804 days.

(21) Appl. No.: 09/917,036

(22) Filed: Jul. 26, 2001

(65) Prior Publication Data
US 2003/0021333 A1 Jan. 30, 2003

(51) Int. Cl.[7] .......................... H04L 1/69; H04L 27/08
(52) U.S. Cl. ...................................... 375/147; 375/345
(58) Field of Search .............................. 375/345, 316, 375/284, 285, 147, 130; 330/129; 455/239.1, 240.1, 244.1

(56) References Cited

U.S. PATENT DOCUMENTS

| | | | | |
|---|---|---|---|---|
| 5,600,681 A | | 2/1997 | Gut .............................. | 375/345 |
| 5,937,377 A | * | 8/1999 | Hardiman et al. .......... | 704/225 |
| 6,205,189 B1 | * | 3/2001 | Ha .............................. | 375/345 |
| 6,240,100 B1 | * | 5/2001 | Riordan et al. ............. | 370/442 |
| 6,480,528 B1 | * | 11/2002 | Patel et al. .................. | 375/148 |
| 6,484,042 B1 | * | 11/2002 | Loke ......................... | 455/550.1 |
| 6,504,867 B1 | * | 1/2003 | Efstathiou ................... | 375/227 |
| 6,556,635 B1 | * | 4/2003 | Dehghan .................... | 375/345 |
| 6,731,703 B2 | * | 5/2004 | Kurihara ..................... | 375/345 |
| 6,792,055 B1 | * | 9/2004 | Hart ............................ | 375/345 |

FOREIGN PATENT DOCUMENTS

WO         0048327         8/2000         ............ H04B/1/66

* cited by examiner

Primary Examiner—Khai Tran
(74) Attorney, Agent, or Firm—Philip R. Wadsworth; Charles D. Brown; Kenyon Jenckes

(57) ABSTRACT

Noise gain control within a communications receiver allows optimization of the receiver design without regard to the predetermined Automatic Gain Control set point. A noise gain controller is provided a copy of the received signal following AGC stages. A noise estimator determines the level of noise within the received signal and couples the noise level estimate to a noise gain discriminator that processes the noise level estimate to produce a gain correction factor. The gain correction factor is filtered and accumulated. The accumulated gain correction factor is used to scale the received signal. Subsequent receiver stages process the scaled received signal.

34 Claims, 6 Drawing Sheets

NOISE GAIN CONTROL

BACKGROUND

I. Field of the Invention

The present invention relates to communications. More particularly, the present invention relates to a novel and improved method and apparatus for automatic gain control in a communications receiver.

II. Description of the Related Art

Wireless devices utilize radio waves to provide long distance communications without the physical constraints of a wire-based system. Information is provided to devices using radio waves transmitted over predetermined frequency bands. Allocation of available frequency spectrum is regulated to enable numerous users access to communications without undue interference.

A remote receiver tuned to a carrier frequency is required to receive and demodulate signals transmitted from a corresponding transmitter at the same carrier frequency. The remote receiver recovers the baseband signal from the modulated carrier. The baseband signal may be directly presented to a user or may be further processed prior to being presented to the user.

A mobile receiver in a portable communication system operates in an environment that subjects the receive signal to numerous degradations. The signal transmitted from a signal source is subject to numerous conditions, such as attenuation, interference, scattering, and reflections, prior to arrival at a receiver. The receiver must be able to recover the signal in spite of all these degradations in order for a successful communication link to be established.

Structures, such as buildings, and surrounding terrain, including walls and hillsides, contribute to the scattering and reflection of the transmitted signal. The scattering and reflection of the transmit signal results in multiple signal paths from the transmitter to the receiver. The contributors to the multiple signal paths change as the receiver moves.

Other signal sources also result in degradation of the desired signal. The other signal sources may be other transmitters intentionally operating on the same frequency as the desired signal as well as transmitters that generate spurious signals in the frequency band of the desired signal.

Other sources of signal degradation are generated within the receiver itself. Signal amplifiers and signal processing stages within the receiver may degrade the level of the desired signal with respect to the level of thermal noise. The signal amplifiers and processors within the receiver may also generate noise products or distort the received signal and further degrade its quality.

Receivers designed to operate within defined communication systems must be designed to operate in spite of all sources of signal degradation. In an exemplary embodiment, the wireless communication system may be a system such as a Code Division Multiple Access (CDMA) wireless system, consistent with "Telecommunications Industry Association (TIA)/Electronics Industries Association (EIA)/IS-2000 STANDARDS FOR CDMA2000 SPREAD SPECTRUM SYSTEMS" referred to as "the cdma2000 standard." In alternate embodiments, the system may be a system consistent with the "TIA/EIA/IS-95 MOBILE STATION-BASE STATION COMPATIBILITY STANDARD FOR DUAL-MODE WIDEBAND SPREAD SPECTRUM CELLULAR SYSTEM," hereinafter referred to as "the IS-95 standard," or other systems such as described by American National Standards Institute (ANSI) "J-STD-008, PERSONAL STATION-BASE STATION COMPATIBILITY REQUIREMENTS FOR 1.8 TO 2.0 GHZ CODE DIVISION MULTIPLE ACCESS (CDMA) PERSONAL COMMUNICATIONS SYSTEMS," or "ANSI J-STD-015 DRAFT STANDARD FOR W-CDMA (WIDEBAND CODE DIVISION MULTIPLE ACCESS) AIR INTERFACE COMPATIBILITY STANDARD FOR 1.85 TO 1.99 GHz PCS APPLICATIONS" referred to as "W-CDMA," or other systems generally referred to as High Data Rate (HDR) systems.

In addition to operating in a noisy environment, a receiver must be capable of handling input signals varying over a large range. A typical receiver operating in a system defined by one of the standards listed above must be capable of handling an input signal range of 100 dB or more. However, a typical signal amplifier remains linear over a much smaller range. A receiver typically incorporates some form of gain control in order to maintain signal linearity at the later stages of the receiver. Gain control may take the form of switched amplifiers, variable gain amplifiers, or a combination of switched and variable gain amplifiers. Additionally, since a receiver may utilize both analog and digital stages, gain control may control the gain of analog stages of the receiver prior to an Analog to Digital Converter (ADC) and may also control the gain of the signal in digital stages following the ADC.

The typical gain control circuit performs Automatic Gain Control (AGC), although it is possible to implement manual gain control in receivers having slowly varying signal levels. The AGC may be implemented using discrete gain steps, constant variable gain, or a combination of the two. An AGC circuit, in a receiver having analog and digital stages, is typically implemented in the analog portion of the receiver in order to optimize the signal level input to the ADC. The AGC is configured such that the mean energy level of the received signal at the input to the ADC is maintained at a predetermined level. This predetermined signal level, termed the AGC set point, is typically chosen to be a number that results in ADC input signal levels near the middle of the ADC range. The design of the digital stages can be optimized to the AGC set point value. The bitwidths of subsequent digital stages may be optimized to the AGC set point. A higher AGC set point may require a larger bitwidth in the subsequent digital stages to ensure the signal does not saturate the digital processing stage. A lower AGC set point, correspondingly, may require a smaller bitwidth in subsequent digital stages. The actual bitwidths implemented in the digital portion of the receiver design are of greater interest when stages of the digital portion of the receiver are implemented within a single Integrated Circuit (IC). A larger bitwidth typically will require a larger physical area and the consumption of more resources within a single IC. Thus, it may be preferable to limit the bitwidths within an IC design to no greater than a minimum level.

The bitwidths of the subsequent digital stages will typically be designed to accommodate the worst case AGC set point when the AGC set point is allowed to vary over the whole range of the ADC. This results in an excessive bitwidth and the consumption of a limited amount of resources within the IC when a lower AGC set point is used in the receiver design.

A similar situation exists for receivers that implement analog stages following the AGC stages. In such a receiver the AGC set point is determined prior to subsequent analog stages. The subsequent analog stages may have limited dynamic ranges, as in the case of an amplifier. It is preferable to design the subsequent analog stages such that an amplifier is linear over the dynamic range determined by the AGC set point. It may not be desirable to implement an amplifier having a dynamic range far exceeding that determined by the AGC set point since both physical space and excessive power is consumed. However, when the AGC set point is allowed to vary over a predetermined range, the subsequent analog stages will typically be designed to accommodate the worst case AGC set point.

In both the digital and analog designs the subsequent stages are typically designed to accommodate the worst case4 AGC set point. If the actual AGC set point of the receiver is not designed to be the worst case AGC set point the result is a non-optimal design for the subsequent stages and the use of excessive resources. What is needed is a method and apparatus for making the receiver design insensitive to the AGC set point value.

SUMMARY

The present embodiments disclose a novel noise gain control method and apparatus in a communications receiver that allows receiver operation to be insensitive to a predetermined AGC set point. A noise gain controller is provided at a copy of the received signal following the AGC stages. A noise estimator is used to determine an estimate of the noise in the received signal. The noise estimate is coupled to a noise gain discriminator that processes the noise estimate. The noise gain discriminator transforms the noise estimate into an error signal. The output of the noise gain discriminator is coupled to a filter that is used to establish the time constant of the noise controller loop. In one embodiment, the filter is a lowpass filter. The output of the filter is coupled to an accumulator. The accumulator is used to accumulate error signals into a composite error signal. The composite error signal is applied to a multiplier that scales the received signal following the AGC stages.

In a first embodiment, the received signal following the AGC is a CDMA signal having quadrature components. The noise estimator is comprised of a despreading and Walsh code decovering stage. This stage of the noise estimator despreads the signal using a Walsh code not assigned to any of the channels within the communication system. In one embodiment, the Walsh code is sixteen chips long. The despread output is coupled to an accumulator. In an embodiment, the accumulator accumulates the signal over a period equal to the length of the Walsh code. In a particular embodiment, the accumulator accumulates the noise over sixteen chips. The output of the accumulator is coupled to a noise energy calculator that calculates the noise energy output from the accumulator. The output of the noise energy calculator is coupled to an energy accumulator. The energy accumulator sums the output from the noise energy calculator over a predetermined time. In an embodiment, the energy accumulator is a discrete accumulator that accumulates the calculated noise energy over a predetermined number of samples. The output of the noise energy accumulator represents the output of the noise estimator.

In another embodiment, the noise estimator is provided a CDMA signal having quadrature components. The first stage is a despreading and Walsh decovering stage as in the first embodiment. However, the despreader uses an arbitrary code. In one embodiment the code is ++−−. The output of the despreader is coupled to an accumulator that is adapted to accumulate the signal over the length of the despreading code.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
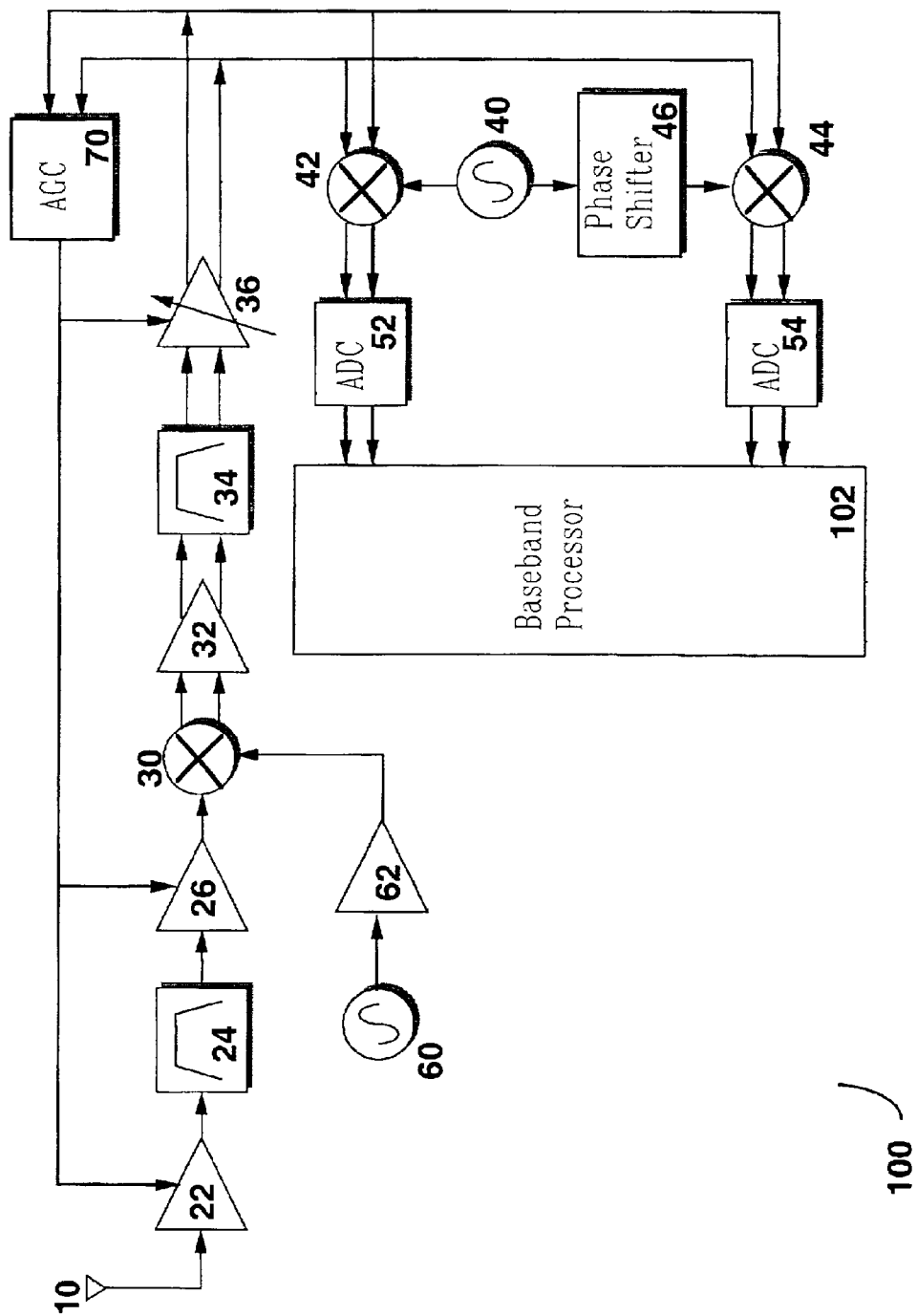
FIG. 1 is a block diagram of a wireless communication receiver.

FIG. 1 shows a block diagram of a wireless receiver 100 such as may be used in a wireless phone. Although a receiver is shown in FIG. 1, it can be seen that the component parts may be combined with a transmitter to produce an integrated transceiver. Similarly, although a wireless receiver is shown in FIG. 1, a wire line device may be configured by eliminating the antenna or coupling the antenna to a wire line connection.

An antenna 10 may be used to interface the receiver 100 to incoming radio waves. The antenna 10 may also be used to broadcast a signal if the receiver 100 is combined with a transmitter in a transceiver configuration. The output of the antenna 10 is coupled to a LNA 22. The LNA 22 following the antenna 20 is used to amplify the receive signal and may also represent the major contributor to the receiver's noise figure. The noise figure of the LNA 22 adds directly to the noise figure of the receiver while the noise figure of subsequent stages is reduced in proportion to the LNA 22 gain. Thus, the LNA 22 is typically chosen to provide a minimal noise figure in the receive band while amplifying the receive signal with sufficient gain to minimize noise figure contributions from subsequent stages. There are competing design requirements, such as DC power requirements and device third order intercept point, that make the choice of LNA 22 gain a trade off of many design constraints. The signal amplified in the LNA 22 is coupled to an RF filter 24. The RF filter 24 is used to provide rejection to signals outside of the receive band. The RF filter 24 is used after, rather than before, the first LNA 22 stage in order to reduce the filter's contribution to the receiver noise figure. The output of the RF filter 24 is coupled to a second LNA 26. The second LNA 26 is used to further amplify the received RF signal. A second LNA 26 stage is typically used where sufficient gain cannot be achieved in a single LNA stage while also satisfying third order intercept constraints although a single LNA may be sufficient in some receiver applications. The output signal from the second LNA 26 is coupled to an input of a RF mixer 30.

The RF mixer 30 mixes the amplified receive signal with a signal generated within a first Local Oscillator (LO) 60 to downconvert the signal to an Intermediate Frequency (IF). The output of the first LO 60 is typically coupled to a buffer amplifier 62 prior to being coupled to the RF mixer 30. The IF output of the RF mixer 30 is coupled to an IF amplifier 32 that is typically used to increase the signal level. In the receiver embodiment shown in FIG. 1, the output of the RF mixer 30 and all subsequent signal processing stages utilize a balanced signal configuration. A balanced signal configuration may be preferred over a single ended configuration due to noise considerations.

The IF amplifier 32 following the RF mixer 30 typically has limited frequency response and does not amplify the upconverted signal that is output from the RF mixer 30. The output of the IF amplifier 32 is coupled to an IF filter 34. The IF filter 34 is used to filter the IF from a single receive channel. The IF filter 34 typically has a much narrower frequency response than does the RF filter 24. The IF filter 32 can have a much narrower bandwidth since the RF mixer 30 typically downconverts the desired RF channel to the same IF regardless of the frequency of the RF channel. In contrast, the RF filter 24 must pass the entire receive band since any channel in the receive band can be allocated to the communication link. The output of the IF filter 34 is coupled to a receive Automatic Gain Control (AGC) amplifier 36.

The AGC amplifier 36 is used to maintain a constant amplitude receive signal for subsequent stages. The gain of the AGC amplifier 36 is varied using a control loop that detects the amplitude of the received signal. The output from the AGC amplifier 36 is coupled to a second downconversion stage as well as to the input to an Automatic Gain Controller (AGC) 70. The AGC 70 in the embodiment shown in FIG. 1 is coupled to the output of the AGC amplifier 36. However, the input to the AGC 70 may be coupled to the output of a subsequent downconversion stage or a baseband stage. The AGC 70 outputs control signals to the amplifiers in the receive signal path in order to maintain a constant signal level at the input to the AGC 70. Here, the AGC 70 outputs control signals to the LNAs, 22 and 26, as well as to the AGC amplifier 36. The AGC 70 controls the gain in the receive signal path such that the signal level at the input to the AGC 70 is relatively constant. The level that the AGC 70 attempts to maintain at its input is known as the AGC set point. The AGC 70 in conjunction with the controlled amplifiers operate as a control loop to maintain the received signal near the AGC set point.

The output of the AGC amplifier 36 is also coupled to a second downconversion stage. In FIG. 1, the receiver 100 is configured to receive a quadrature modulated signal and the second downconversion stage utilizes two mixers. A first IF mixer 42 downconverts the IF signal to a baseband signal. The second Local Oscillator (LO) 40 used in conjunction with the IF mixer 42 may be separate and distinct from the first LO 60. The output of the second LO 40 is coupled to the first IF mixer 42. The output of the first IF mixer 42 is designated as an in phase or I signal component of the received signal. The I signal component of the received signal is coupled to a first Analog to Digital Converter (ADC) 52. The digitized I signal component is coupled to the baseband processor 102.

The output of the AGC amplifier 36 is also coupled to a second IF mixer 44. A phase shifted version of the second LO 40 is used to drive the second IF mixer 44. The phase shifted LO is generated by coupling the output of the second LO 40 to a phase shifter 46 and then coupling the phase shifted output to the second IF mixer 44. The LO signals driving the first IF mixer 42 and second IF mixer 44 are in quadrature when the phase shifter 46 provides ninety degrees of phase shift. The resultant output of the second IF mixer 44 is termed the quadrature, or Q signal component, of the received signal since it is in quadrature with the I signal component. The Q signal component is then coupled to a second ADC 54 which digitizes the signal and couples the digitized signal to the baseband processor 102.

The baseband processor 102 block represents subsequent signal processing that is performed on the baseband signal. The subsequent baseband processing includes the noise gain control as described in detail below. Other examples of subsequent processing include, but are not limited to, despreading, deinterleaving, error correction, filtering, and amplification. The received information processed in the baseband processor 102 is then routed to the appropriate destination. The information may be used within the receiver 100 or may be routed to a user interface such as a display, loudspeaker, or data port.

It may be seen that the signal amplitude at the ADC inputs, and thus at the baseband processor inputs, may be dependent upon the AGC set point. The AGC set point may be defined with respect to the composite signal power or may be defined with respect to the I and Q signal components when the signal is a quadrature modulated signal. In an embodiment where the received signal is a quadrature modulated signal, the AGC set point may be defined as the sum of the squares of the I and Q components, or $I^2+Q^2$. The receiver designer may arbitrarily assign the actual AGC set point value, although typically the determination is made using the dynamic range of the ADC. Different receiver designs using the same ADCs may incorporate different AGC set points, depending on design trade off investigated.

Figure 2:
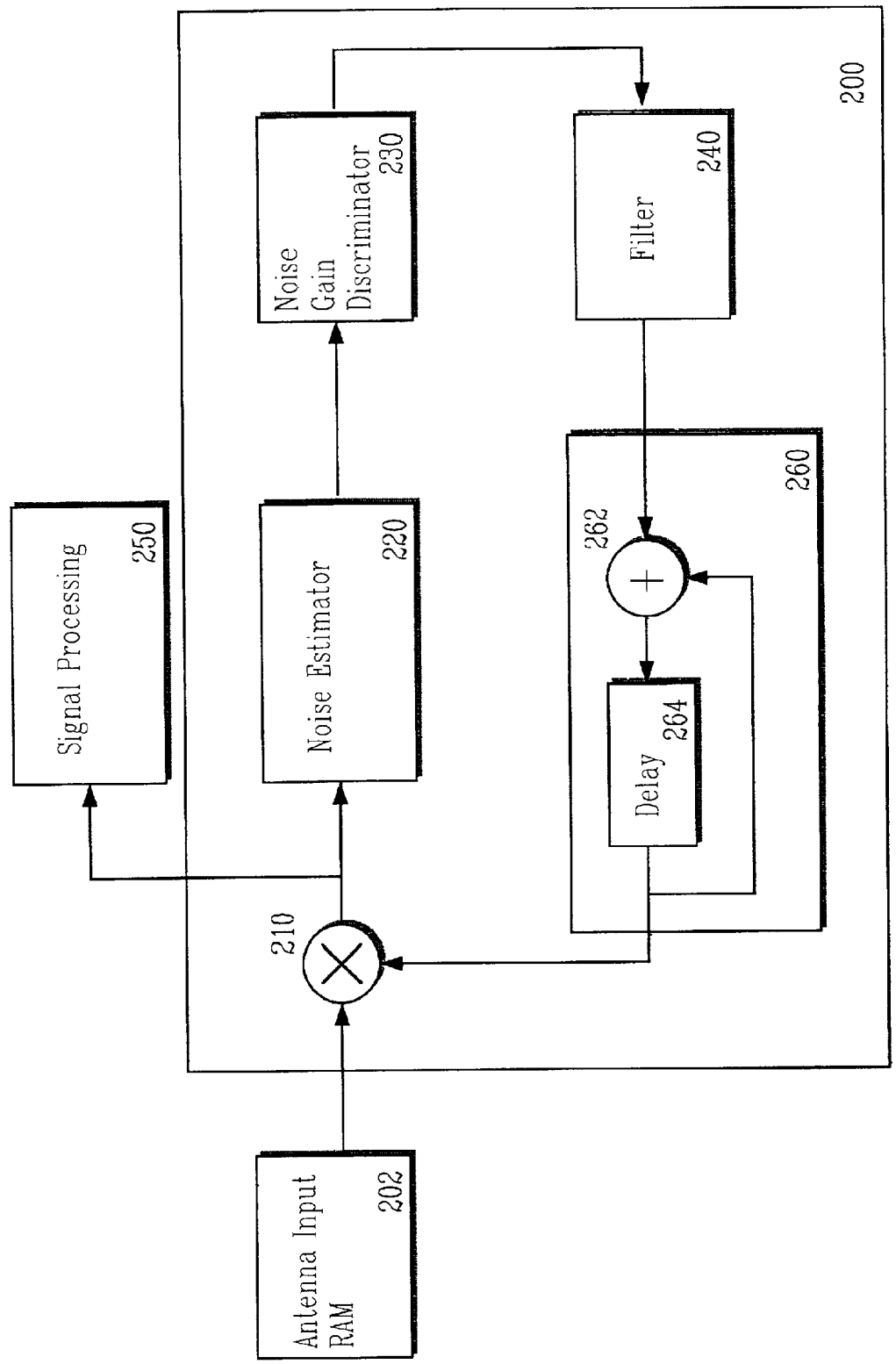
FIG. 2 is a block diagram of a noise gain controller.

The digital signal processing stages following the AGC stage may be designed to be insensitive to the AGC set point by incorporating a Noise Gain Controller (NGC) 200 as shown in FIG. 2. The Noise Gain Controller (NGC) 200 is coupled to the receiver front end and operates as a signal processor on signals following the AGC stages. In FIG. 2, the NGC 200 is coupled to Antenna Input RAM 202. The Antenna Input RAM 202 may represent a buffer that receives the ADC outputs from the initial signal processing stages of the receiver. Alternatively, the NGC 200 may be coupled to the ADCs and may receive the digitized receive signals with no buffering. In an analog configuration, the NGC 200 may be coupled to the final output stage of the AGC loop. Regardless of the receiver configuration, the NGC 200 is typically configured to follow the AGC loop.

The initial signal processing element in the NGC 200 is a multiplier 210. The output of the Antenna Input RAM 202 is coupled to a first input of the multiplier 210. Alternatively, the initial signal processing element in the NGC 200 may be a signal summer having in phase signal inputs or a combination of in phase and inverted signal inputs. In another embodiment, the initial signal processing element in the NGC 200 may be a signal combining means having first and second inputs and an output that is a signal processed version of the inputs. The signal combining means may incorporate a predetermined transfer function using the signals provided at the first and second inputs to generate an output. The output of the multiplier 210, or signal combining means, represents the corrected output of the NGC 200, and is coupled to the signal processing 250 stages that would normally follow the Antenna Input RAM 202 in the absence of a NGC 200. The output of the multiplier 210 is also coupled within the NGC 200 to a Noise Estimator 220. The Noise Estimator 220 is used to extract an estimate of the noise level within the composite received signal. Particular embodiments of Noise Estimators 200 are provided in FIGS. 3 and 4 and are discussed in further detail below.

The output of the Noise Estimator 220 is coupled to a Noise Cain Discriminator 230. The Noise Gain Discriminator 230 incorporates a predetermined transfer function to generate an output signal that represents an error signal, also known as a gain correction factor. In one embodiment, the Noise Gain Discriminator 230 normalizes the noise estimate to a predetermined noise gain set point value and then calculates the inverse. In another embodiment, the Noise Gain Discriminator 230 calculates the difference between a predetermined noise gain set point value and the noise estimate. The predetermined noise gain set point value used in the Noise Gain Discriminator 230 calculation is distinct from the AGC set point value used in the AGC loop. The noise gain set point may or may not have the same value as the AGC set point. The operation of the NGC 200 is not affected by the relative differences between the noise gain set point and AGC set point.

The output of the Noise Gain Discriminator 230 is coupled to a lowpass filter 240. The lowpass filter 240 is used to establish the loop bandwidth used in the NGC 200. The lowpass filter 240 may be eliminated if the output of the Noise Gain Discriminator 230 is of the proper bandwidth or if signal filtering is incorporated into the transfer function of the Noise Gain Discriminator 230. The output of the lowpass filter 240 is coupled to an error signal accumulator 260.

The error signal accumulator 260 comprises an error summer 262 having a first input coupled to the input to the error signal accumulator 260 and a second input coupled to the output of the error signal accumulator 260. The output of the error summer 262 is coupled to a delay element 264. The delay element 264 may be implemented as a register, buffer, FIFO or any other means capable of delaying a signal. The output of the delay element 264 is also the output of the error signal accumulator 260 and is coupled to a second input of the multiplier 210.

Thus, the scaled output of the multiplier 210 represents the input signal to the NGC 200 corrected for the noise level. Where the noise gain discriminator 230 calculates the inverse ratio of the noise estimate to a predetermined noise gain set point value, the output of the NGC 200 is a signal normalized to the noise gain set point value. Thus, the noise gain set point value may represent the effective AGC set point value seen by all stages subsequent to the NGC 200.

In one embodiment the receiver is a CDMA receiver and the signal processing stages represent the baseband signal processing stages within a CDMA receiver. Each finger of a multi-finger rake receiver implemented within the CDMA receiver utilizes an independent NGC 200. By normalizing the received signals to a predetermined noise gain set point, the signal processing stages may be optimized for the noise gain set point.

The AGC set point is based on the energy of all received channels and noise while the NGC set point is based only on noise. This is helpful when the NGC and subsequent signal processing stages are implemented within a single Integrated Circuit (IC) and the IC is implemented within multiple receiver designs, each having their AGC set point independently determined during the design process.

Figure 3:
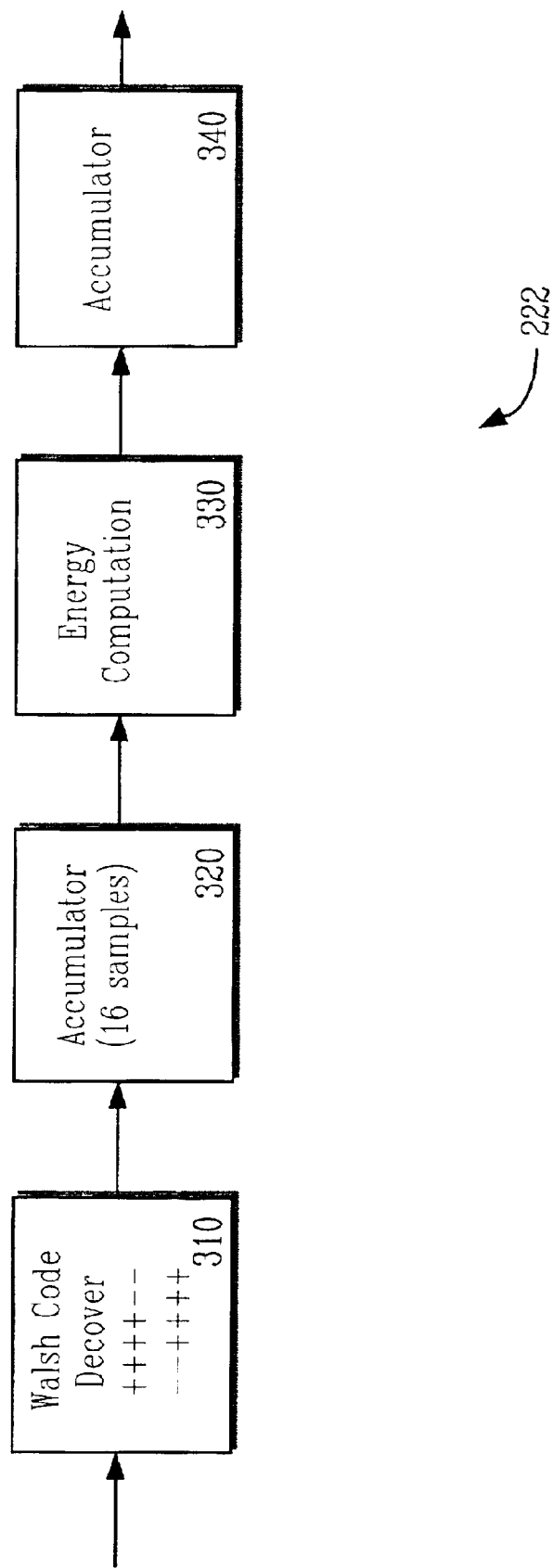
FIG. 3 is a block diagram of a noise estimator.

FIG. 3 shows a block diagram of an embodiment of a Noise Estimator 222 that may be used within a CDMA receiver. In a CDMA system, multiple channels are made orthogonal using Walsh codes. In general, each channel information symbols of a predetermined length. Each channel is assigned one of a plurality of orthogonal Walsh codes. A noise estimator may be designed by multiplying the received signal by a Walsh code that has not been assigned to any information carrying signal.

The embodiment shown in FIG. 3 may be implemented within a CDMA receiver designed to receive signals in accordance with the cdma2000 standard, where the receiver is designed to receive the reverse link signals broadcast from a mobile station to a base station. However, it may be seen that the particular implementation of the Noise Estimator 222 is not limited to this particular application.

The input signal to the Noise Estimator 222 is coupled to a Walsh Code Decover stage 310. The reverse link in a communication system operating in accordance with the cdma2000 standard allows each mobile unit to generate multiple simultaneous code channels through the use of Walsh codes. Multiple simultaneous code channels are allowed in some configurations of the cdma2000 standard reverse link using orthogonal Walsh codes. The received symbol may be recovered by despreading the received signal with the appropriate Walsh code. Symbols that do not correlate with the appropriate Walsh code appear as noise. The Noise Estimator 222 uses the orthogonal properties of Walsh codes to generate a noise estimate of the received signal. The Walsh Code Decover stage 310 despreads and decovers the input signal using a Walsh code that is not assigned to any channel. In one embodiment, the Walsh code used to despread and decover the received signal is "++++--------++++", where binary signals are represented with "+" or "−" values and "+" may represent a "0" and "−" may represent a "1". The resultant output is an estimate of the noise in the received signal since the Walsh code used does not correspond to the Walsh code for any channel.

The output of the Walsh Code Decover stage 310 is then coupled to a noise accumulator 320. In the embodiment shown in FIG. 3 the noise accumulator 320 accumulates the output of the Walsh Code Decover stage 310 over the length of the Walsh code. The noise accumulator 320 in this embodiment accumulates the noise estimate over sixteen samples, or chips, since the Walsh code length used to despread the signal is sixteen. Accumulating over the same number of chips as is used to spread the symbols results in an accumulation time of one symbol. The output of the noise accumulator 320 is coupled to an Energy Computation 330 where the accumulated noise estimate is transformed into an energy value. In a CDMA receiver application, the input signal to the Noise Estimator 222 may be a quadrature signal. The Walsh Code Decover 310 and noise accumulator 320 may be configured to process both the I and Q components of the quadrature signal. In an embodiment there may be parallel processing stages for the I and Q components, while in another embodiment the processing of the I and Q components may be time multiplexed.

Energy Computation 330 may calculate the energy of the accumulated quadrature signal by summing the squares of the I and Q components. The energy Computation 330 outputs $I^2+Q^2$ as the resultant energy value. The output of the Energy Computation 330 is coupled to an Energy Accumulator 340 that is used to accumulate a predetermined number of calculated energy values. The Energy Accumulator 340 may be used to average the fluctuations in the computed energy values to make the NGC less sensitive to sudden variations in noise energy. The output of the Energy Accumulator 340 is coupled to the output of the Noise Estimator 222.

Figure 4:
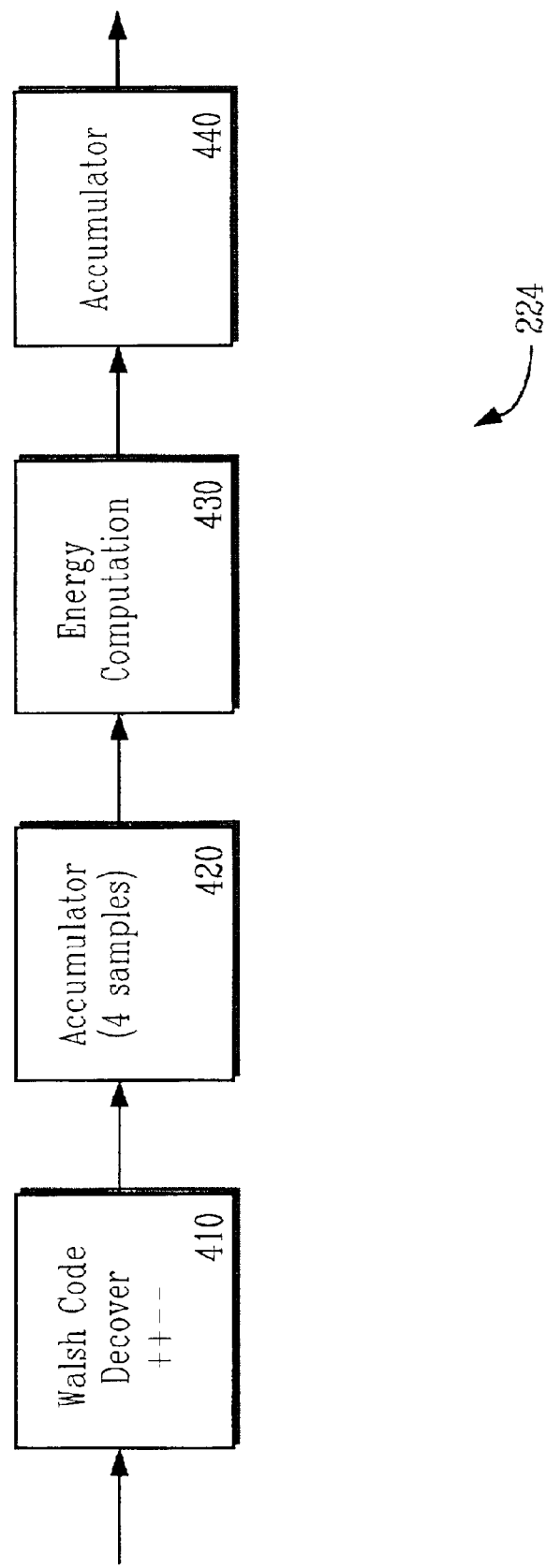
FIG. 4 is a block diagram of a noise estimator.

A block diagram of another embodiment of a Noise Estimator 224 is shown in FIG. 4. The configuration of the Noise Estimator 224 of FIG. 4 is similar to the Noise Estimator 222 of FIG. 3. The input signal to the Noise Estimator 224 is coupled to a Walsh Code Decover 410 where the first stage in processing a noise estimate is performed. The Walsh Code Decover 410 despreads and decovers the input signal using a predetermined code. The only constraints on the predetermined code are that there are an equal number of ones and zeros. In one embodiment, the code used to despread and decover the input signal is "++−−". Here, as in the previous Noise Estimator 222 embodiment, binary signals are represented with "+" or "−" values and "+" may represent a "0" and "−" may represent a "1". Ideally, the despreading code does not duplicate any code used to spread the input signal. In a communication system operating in accordance with the IS-95 standard, the reverse link does not spread each individual signal with a Walsh code. In an IS-95 standard reverse link, one of sixty four possible orthogonal Walsh codes is transmitted for each group of six code symbols. Thus, there may not be an orthogonal Walsh code used to despread the input signal that ensures no correlation with the input signal. The output of the Walsh Code Decover 410 is coupled to a noise accumulator 420. The noise accumulator 420 is configured to accumulate the despread signal over the length of the Walsh code used in the despreading process. The noise accumulator 420 is configured to accumulate four consecutive samples when the despreading code is "++--". The output of the noise accumulator 420 is coupled to an Energy Computation 430 where the energy of the accumulated samples is calculated. Where the input signal is a quadrature signal, as is used in CDMA systems, the energy can be calculated as the sum of the squares of the I and Q signal components. The output of the Energy Computation 430 is coupled to an Energy Accumulator 440 where a predetermined number of energy calculations are accumulated. The output of the Energy Accumulator 440 is coupled to the output of the Noise Estimator 440.

Fluctuations in the pilot energy are minimized because the NGC operates only on noise. The noise level is estimated by multiplying the received signal by an unassigned Walsh code. When a conventional AGC loop alone is used to adjust the signal level, the pilot energy coupled to the signal processing stages will vary depending on the composite energy of the received signal. One problem identified with adjusting the received signal level with only an AGC loop is seen where a signal is transmitted on an orthogonal CDMA channel at a high power level relative to the pilot and remaining active channels. In this condition, the AGC loop normally reduces the signal power incident on the signal processing stages. In a CDMA system incorporating burst data transmission, the burst nature of the data channel causes a corresponding fluctuation in the received signal level at the signal processing stages because of AGC effects. However, in a CDMA environment, the orthogonal channels have minimal effect on the signal processing of desired code channel because of the orthogonal nature of the signal. Thus, the AGC effectively reduces the desired received signal level to a level below the optimal level. In contrast, the NGC loop only reduces the received signal level when the noise in the received signal increases relative to the desired code channel.

Figure 5:
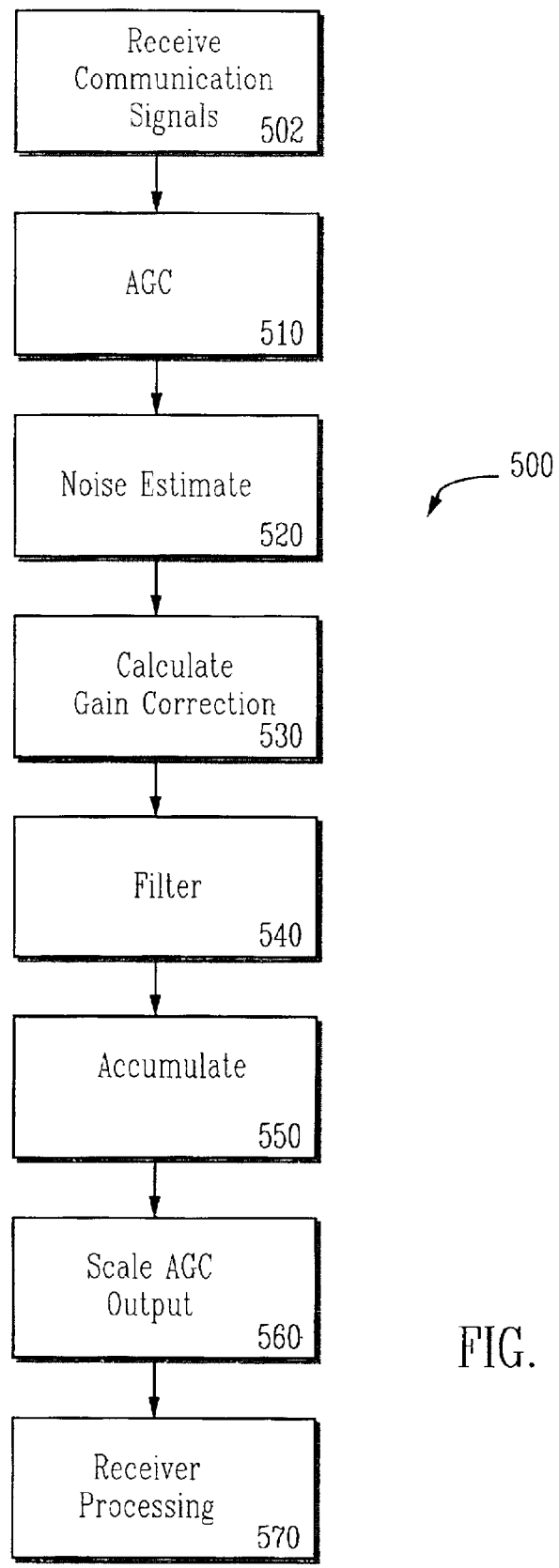
FIG. 5 is a flow chart of a noise gain control method.

A flow chart of a method of correcting a received input signal using noise gain control 500 is shown in FIG. 5. The method starts by receiving communication signals 502. The communication signals are then processed in an AGC loop 510 before being coupled to a noise estimator 520. The AGC loop is configured to maintain the received signals about an AGC set point, within the limits of the abilities of the AGC loop. The noise estimator calculates an estimate of the noise in the gain controlled signal. Once the noise estimate is determined, the noise estimate is used to calculate a gain correction 530. In one embodiment, the gain correction is calculated by normalizing the noise estimate to a predetermined noise gain set point and inverting the normalized result. In another embodiment, the gain correction is calculated by subtracting the noise estimate from a predetermined noise gain set point. The method next filters the gain correction 540 to minimize the ability of the gain correction to make sudden changes. The filtered gain correction is next accumulated 550 to achieve an aggregate, or accumulated, gain correction. The accumulated gain correction is then used to scale the output of the AGC signal 560 for subsequent receiver processing 570 of the AGC output signals.

Figure 6:
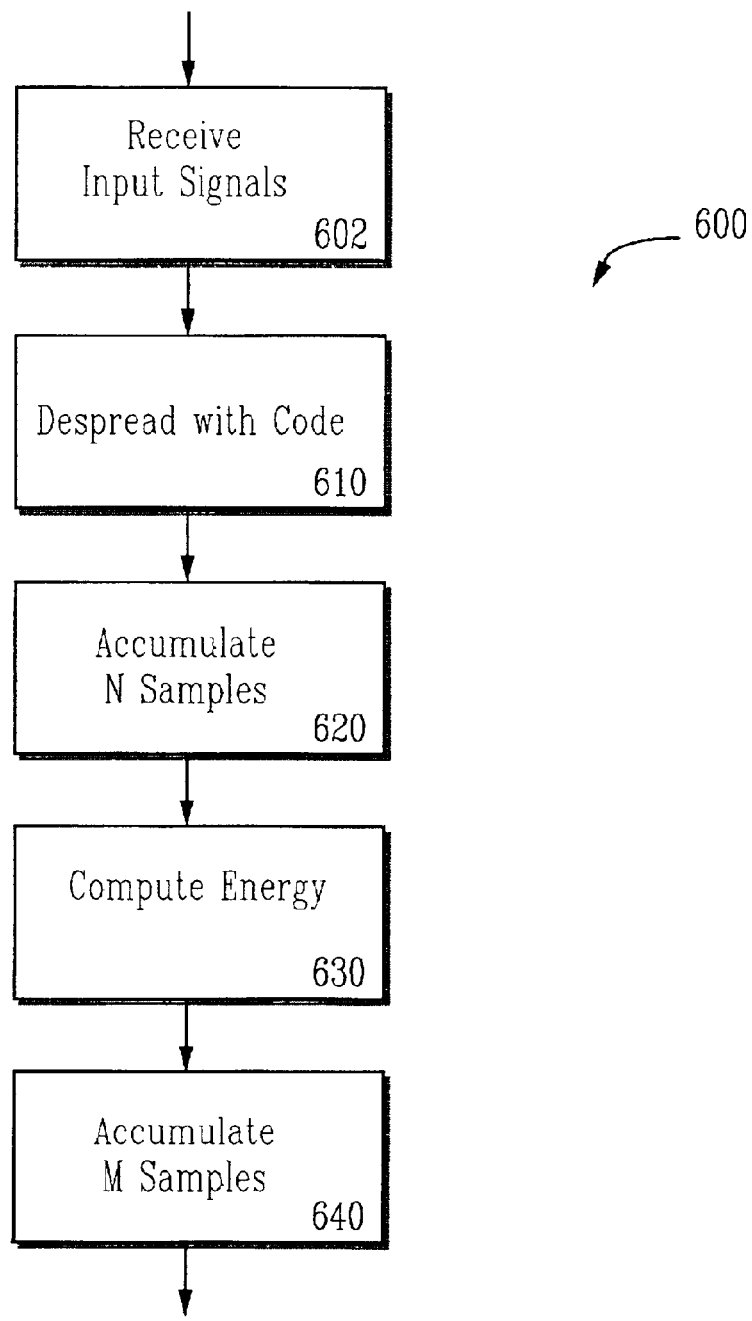
FIG. 6 is a flow chart of a noise estimator method.

An embodiment of a method of noise estimating 600 is shown in FIG. 6. The noise estimator method 600 first receives an input signal 602. Here, the input signal may be the scaled output from an earlier AGC stage used within a receiver. The method next despreads the input signal 610 using a Walsh code or other predetermined code having a predetermined length. In a first embodiment, the input signal is despread using a Walsh code having a length of sixteen chips. In another embodiment, the Walsh code used to despread the input signal is "++++--------++++", where binary signals are represented with "+" or "−" values and "+" may represent a "0" and "−" may represent a "1". In an alternative embodiment, "+" may represent a "1" and "−" may represent a "0". In another embodiment, the code used to despread the input signal is a code of even length having an equal number of "+" and "−" chips. In another embodiment, the code used to despread the input signal is "++--".

Once the method despreads the input signal 610 the method next accumulates the despread output over a predetermined number of samples 620. In one embodiment the predetermined number of samples is equal to the despread code length. In one embodiment, the predetermined number of samples is sixteen, while in another embodiment, the predetermined number of samples is four. The method next computes the energy 630 in the accumulated noise estimate. In one embodiment, the received signal is a quadrature signal and the energy is computed as the sum of the squares of the I and Q noise estimate components. The computed energy value is then accumulated over another predetermined number of energy accumulations 640. The result of the energy accumulations is the output of the noise estimator method 600.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty.

Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. Thus, the present invention is not intended to be limited to the embodiments shown herein but is to be accorded the widest scope consistent with the principles and novel features disclosed herein.

I claim:

1. A signal processor comprising:
   a signal combiner having a first input, a second input, and an output, wherein the signal combiner is characterized by a combiner transfer function;
   a noise estimator having an input coupled to the output of the signal combiner to generate a noise estimate of a signal output from the signal combiner;

a noise gain discriminator, characterized by a discriminator transfer function, coupled to the noise estimator to generate a gain correction factor; and an error signal accumulator having an input coupled to the noise gain discriminator and an output coupled to the second input of the signal combiner;

wherein the signal processor maintains the output of the signal combiner at a predetermined noise gain set point.

2. The signal processor of claim 1 further comprising a filter interposed between the noise gain discriminator and error signal accumulator.

3. The signal processor of claim 2 wherein the filter is a lowpass filter.

4. The signal processor of claim 1 further comprising a receiver, wherein the first input of the signal combiner is coupled to an output subsequent to a receiver Automatic Gain Control (AGC) stage.

5. The signal processor of claim 1 wherein the receiver is a wireless communication receiver.

6. The signal processor of claim 5 wherein the wireless communication receiver is adapted to receive Code Division Multiple Access (CDMA) signals.

7. The signal processor of claim 1 further comprising a baseband signal processor coupled to the output of the signal combiner, wherein the baseband signal processor is adapted to demodulate the signal output from the signal combiner.

8. The signal processor of claim 1 wherein the first input of the signal combiner is adapted to input multiple signals, the output of the signal combiner is adapted to output multiple signals, and the input of the noise estimator is adapted to input multiple signals.

9. The signal processor of claim 8 wherein the multiple signals are I and Q components of a quadrature signal.

10. The signal processor of claim 1 wherein the noise estimator comprises:

a Walsh Code Decover stage adapted to despread and Walsh decover a noise estimator input signal;

an accumulator coupled to the Walsh Code Decover stage adapted to accumulate a predetermined number of outputs from the Walsh Code Decover stage;

an energy computation coupled to the accumulator adapted to calculate an energy estimate of the accumulator output; and an energy accumulator adapted to accumulate a predetermined number of energy estimates.

11. The signal processor of claim 10 wherein the Walsh Code Decover stage despreads and Walsh decovers the input signal using a Walsh code not assigned to a channel within a communication system.

12. The signal processor of claim 11 wherein the Walsh code used to despread and decover the input signal has a length equal to a Walsh code length used within the communication system.

13. The signal processor of claim 12 wherein the Walsh code length is sixteen.

14. The signal processor of claim 13 wherein the Walsh code is "++++----++++", where binary signals are represented with "+" or "-" values and "+" represents a "0" and "-" represents a "1".

15. The signal processor of claim 11 wherein the predetermined number of outputs from the Walsh Code Decover stage accumulated by the accumulator is equal to the Walsh code length used in the Walsh Code Decover stage.

16. The signal processor of claim 11 wherein the Walsh code used to despread and decover the input signal has an equal number of ones and zeros.

17. The signal processor of claim 16 wherein the Walsh code used to despread and decover the input signal has a length of four.

18. The signal processor of claim 17 wherein the Walsh code used to despread and decover the input signal is "++--", where binary signals are represented with "+" or "-" values and "+" represents a zero and "-" represents a one.

19. The signal processor of claim 10 wherein the noise estimator input signal is a quadrature signal having an I signal component and a Q signal component.

20. The signal processor of claim 19 wherein the Walsh Code Decover stage has an I input, a Q output, an I output, and a Q output.

21. The signal processor of claim 20 wherein the accumulator independently accumulates I and Q signal outputs from the Walsh Code Decover stage to produce an accumulated I output signal and an accumulated Q output signal.

22. The signal processor of claim 21 wherein the energy estimate is the sum of the squares of the accumulated I output signal and the accumulated Q output signal.

23. The signal processor of claim 1 wherein the gain correction factor generated by the noise gain discriminator is the difference between an input to the noise gain dacriminator and the predetermined noise gain set point.

24. The signal processor of claim 1 wherein the gain correction factor generated by the noise gain discriminator is the ratio of the predetermined noise gain set point to an input signal to the noise gain discriminator.

25. A signal processor comprising:

a noise gain controller adapted to scale an input signal such that a constant noise energy level is maintained at the output signal, the noise gain controller comprising:
a signal combiner adapted to scale the input signal by a gain correction factor to produce the output signal;
a noise estimator adapted to calculate a noise estimate of the output signal; and
a noise gain estimator adapted to generate the gain correction factor based on the noise estimate and a predetermined noise gain set point; and a baseband processor coupled to the output of the noise gain controller adapted to demodulate the output signal.

26. A method of signal processing comprising:

receiving communication signals;

processing the communication signals to produce and output signal having a constant noise energy, said processing comprising:
estimating a noise energy in the communication signals;
calculating a gain correction factor using the noise energy estimate and a predetermined noise gain set point; and
scaling the communication signals by the gain correction factor; and demodulating the output signal.

27. The method of claim 26 wherein estimating the noise energy comprises:

despreading the input signals to produce noise samples;

accumulating a predetermined number of noise samples;

computing an energy estimate of the noise samples; and accumulating a predetermined number of energy estimates.

28. The method of claim 26 wherein the input signals are despread using a Walsh code.

29. The method of claim 28 wherein the Walsh code is a Walsh code not assigned to any communication channel within a communication system generating the input signals.

30. The method of claim 29 wherein the Walsh code not assigned to any communication channel is of the same length as an assigned Walsh channel within the communication system.

31. The method of claim 30 wherein the assigned Walsh code length is sixteen.

32. The method of claim 29 wherein the Walsh code not assigned to any communication channel is "++++--------++++", where binary signals are represented with "+" or "−" values and "+" represents a "0" and "−" represents a "1".

33. The method of claim 26 wherein the input signals are despread using a predetermined code having an equal number of ones and zeros.

34. The method of claim 33 wherein the predetermined code is "++--", where binary signals are represented with "+" or "−" values and "+" represents a zero and "−" represents a one.

* * * * *